United States Patent [19]

Bevilacqua et al.

[11] Patent Number: 5,588,031
[45] Date of Patent: Dec. 24, 1996

[54] APPARATUS FOR REINFORCING A REACTOR VESSEL CORE SHROUD

[75] Inventors: Bruce W. Bevilacqua, Export; Louis J. Malandra, McKeesport; Robert E. Meuschke, Monroeville; Alex W. Harkness, Gibsonia, all of Pa.

[73] Assignee: Westinghouse Electric Corporation, Pittsburgh, Pa.

[21] Appl. No.: 330,058

[22] Filed: Oct. 27, 1994

[51] Int. Cl.⁶ .................................................. G21C 9/00
[52] U.S. Cl. .................................. 376/287; 376/302
[58] Field of Search ................................. 376/302, 304, 376/287

[56] References Cited

U.S. PATENT DOCUMENTS

| | | | |
|---|---|---|---|
| T911,015 | 6/1973 | Garkisch et al | 176/85 |
| 2,998,370 | 8/1961 | Gaunt et al. | 204/193.2 |
| 3,129,836 | 4/1964 | Frevel | 220/1 |
| 3,850,795 | 11/1974 | Thome | 176/50 |
| 4,135,974 | 1/1979 | Garkisch et al. | 176/87 |
| 4,199,403 | 4/1980 | Puri et al. | 176/61 |
| 4,379,119 | 4/1983 | Fujimoto | 376/302 |
| 4,596,689 | 6/1986 | Gorholt et al. | 376/302 |
| 5,257,295 | 10/1993 | Chevereau et al. | 376/302 |
| 5,392,322 | 2/1995 | Whitling et al. | 376/260 |
| 5,402,570 | 4/1995 | Weems et al. | 29/890.031 |

FOREIGN PATENT DOCUMENTS 1217141  12/1970  United Kingdom .................. 376/302

OTHER PUBLICATIONS

Engineering News Record; Title: Reactor Shroud Gets Braces; Feb. 7, 1994; p. 14.

Primary Examiner—Charles T. Jordan
Assistant Examiner—Chrisman D. Carroll

[57] ABSTRACT

An apparatus, which reinforces a shroud that is contained within a reactor vessel, is operable for reinforcement of the shroud in the event of cracking in the shroud. The apparatus comprises a reactor wall positioned surrounding the shroud. A beam is attached to and extends generally axially on the shroud for absorbing the forces generated by the cracking in the shroud, and a radial support is positioned between the beam and the wall of the reactor vessel for transmitting any forces absorbed by the beam to the wall.

3 Claims, 3 Drawing Sheets

1
APPARATUS FOR REINFORCING A REACTOR VESSEL CORE SHROUD

FIELD OF THE INVENTION

The present invention relates generally to a core shroud that is contained within a reactor vessel of a nuclear power plant and, more particularly, to an apparatus for reinforcing the core shroud in the event of cracking or other conditions of similar magnitude.

BACKGROUND OF THE RELATED ART

In a commercial nuclear reactor, heat, from which steam and ultimately electricity are generated, is produced by fissioning of a fissible material, such as enriched uranium, contained in a reactor core which is, in turn, contained within a reactor vessel. The reactor vessel includes a flanged, dish shaped closure head bolted atop a flanged, generally cylindrical shaped reactor body; the reactor vessel is entirely contained within a containment building for containing any unlikely radiation leakage within the containment building should an accident occur.

A generally cylindrical shaped core shroud extends coaxially inside the reactor vessel for creating an annulus between the reactor vessel and core shroud. The core shroud typically includes an upper portion with a slightly greater diameter than its middle portion, and its middle portion with a slightly greater diameter than its lower portion.

Although the presently known and utilized core shroud is satisfactory, it is not without drawbacks. In the area where its upper, middle and lower portions are respectively joined together, there is a tendency for stress corrosion cracking.

Consequently, a need exists for a core shroud repair which is operable for reinforcing the core shroud in the event of stress corrosion cracking or events of similar magnitude.

SUMMARY OF THE INVENTION

The present invention provides an improvement designed to satisfy the aforementioned needs. Particularly, the present invention is directed to an apparatus, which reinforces a core shroud that is contained within a reactor vessel, operable in the event of cracking or events of similar magnitude in the core shroud, the apparatus comprising: (a) a reactor vessel wall positioned surrounding the shroud; (b) a beam attached to the shroud for absorbing the forces generated in the shroud; and (c) a radial support positioned between said beam and said reactor vessel wall for transmitting any forces absorbed by said beam to said reactor vessel wall which, in effect, reduces the loads in said beam and also maintains generally uniform distribution of the loads absorbed by said beam for allowing said beam to absorb the generated forces.

It is an object of the present invention to provide a device for reinforcing the core shroud in the event of cracking.

It is a feature of the present invention to provide a beam extending generally vertically on the shroud and a radially extending support attached thereto and resting against a reactor vessel wall for transmitting the forces created in the core shroud by the cracking to the reactor vessel wall.

It is an advantage of the present invention to provide the vertically extending beam in a configuration which is easily attached to the core shroud.

BRIEF DESCRIPTION OF THE DRAWINGS

In the course of the following detailed description, reference will be made to the attached drawings in which.

DETAILED DESCRIPTION OF THE INVENTION

Figure 1:
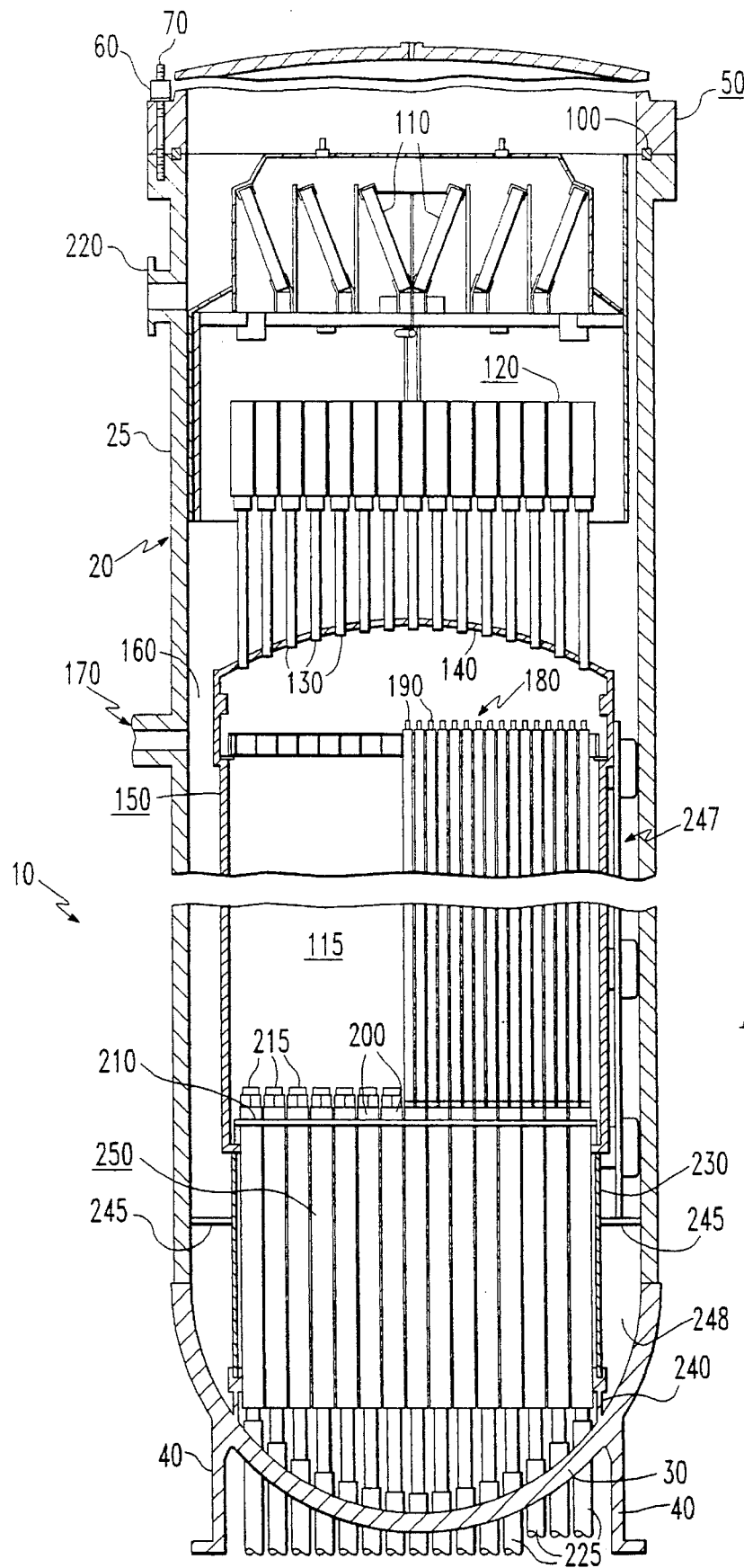
FIG. 1 depicts a view in partial vertical cross section of a typical boiling water reactor vessel.

In the following description, like reference characters designate like or corresponding parts through-out the several views of the drawings. Also, in the following description, it is to be understood that such terms as "forward," "left," "right," "upwardly," "downwardly," and words of similar import are words of convenience and are not to be construed as limiting terms.

Referring to FIG. 1, a reactor vessel 10 is shown for converting water to steam. The reactor vessel includes an upright pressure housing 20 having a cylindrical wall 25 which is closed at its lower portion by a dish-shaped bottom head 30 having downwardly extending feet 40 which rest on a foundation (not shown), typically a floor. The upper end of the pressure housing 20 is closed by a removable dome-shaped top head 50 secured to the pressure housing 20 by a plurality of nuts 60 and stud bolts 70 (only one of each is shown). The top head 50 is sealed by a gasket 100 to the upper end of the pressure housing 20 for forming a secondary seal therebetween. Steam dryer panels 110, which may be of a conventional type, are mounted in the upper end of the vessel 10 for drying the steam as it passes therethrough. Water is maintained in the lower portion 115 of the vessel 10 for providing a medium which will convert to steam.

Steam separators 120, which also may be of conventional construction, are mounted in the vessel 10 just below the steam dryer panels 110 for separating the properly dried steam from the steam containing water in excess of a predetermined amount.

A plurality of separator vapor tubes 130 extend down respectively from each steam separator 120 and is sealed through a steam plenum cap 140 of a cylindrical shroud 150 disposed coaxially within the pressure housing 20 to leave an upright space or downcomer annulus 160 between the shroud 150 and the housing 20. The shroud 150 has a generally tapered configuration with its upper portion having a greater diameter than its middle portion, and its middle portion having a slightly greater diameter than its lower portion. Feed water is supplied to the reactor vessel 10 through four feed water sparger nozzles 170 (only one sparger nozzle is shown) located at equal intervals in a horizontal plane. A reactor core fuel assembly 180 is made up of a plurality of elongated vertical fuel assemblies 190 which are arranged in groups of four. The lower end of each fuel assembly 190 in each group rests on a vertical respective control rod guide tube 200 sealed at its upper end through a horizontal bottom grid plate 210 mounted across the bottom of the shroud 150. Each guide tube 200 extends down below the bottom grid plate 210, and a separator control rod 215 is mounted in each control rod guide tube 200 to slide longitudinally up and down between the four adjacent elongated vertical fuel assemblies 190 resting on the grid tube 200. Thimble tubes 225 are positioned in the lower portion of the reactor vessel 10 for receiving control rods (not shown) which control the nuclear reaction in the reactor vessel.

Water flows upwardly through the fuel assemblies 190 where water changes to steam, and then passes as a steam-water mixture out of the vapor tubes 130 and through the steam separators 120. Water separated from the steam in the separators 120 is returned to the downcomer annulus 160. Steam passes the steam drier panels 110, and leaves the vessel 10 through a steam outlet 220 to pass through a conventional steam turbine and condenser (both of which are not shown), as is well known in the art. Condensed steam is returned from the condenser to the feed water sparger nozzles 170 by a conventional pump (not shown).

The lower end of the shroud 150 is welded to the upper end of a cylindrical shroud support skirt 230, the lower end of which is welded to an annular ring 240 formed integrally with the bottom head 30 of the vessel 10. An annular shaped support structure 245 extends around the core shroud 150 and between the core shroud 150 and the pressure housing 20 for assisting in supporting the core shroud 150. As will be discussed later in detail, a plurality of reinforcing devices 247 (only one of which is shown) are attached to the core shroud 150 in a spaced apart relationship with each other for reinforcing the core shroud 150 in the event of cracking in the core shroud 150. A core inlet plenum chamber 250 is formed within the shroud support skirt 230 and between the bottom grid plate 210 and the bottom head 30 of the vessel 10.

Figure 2:
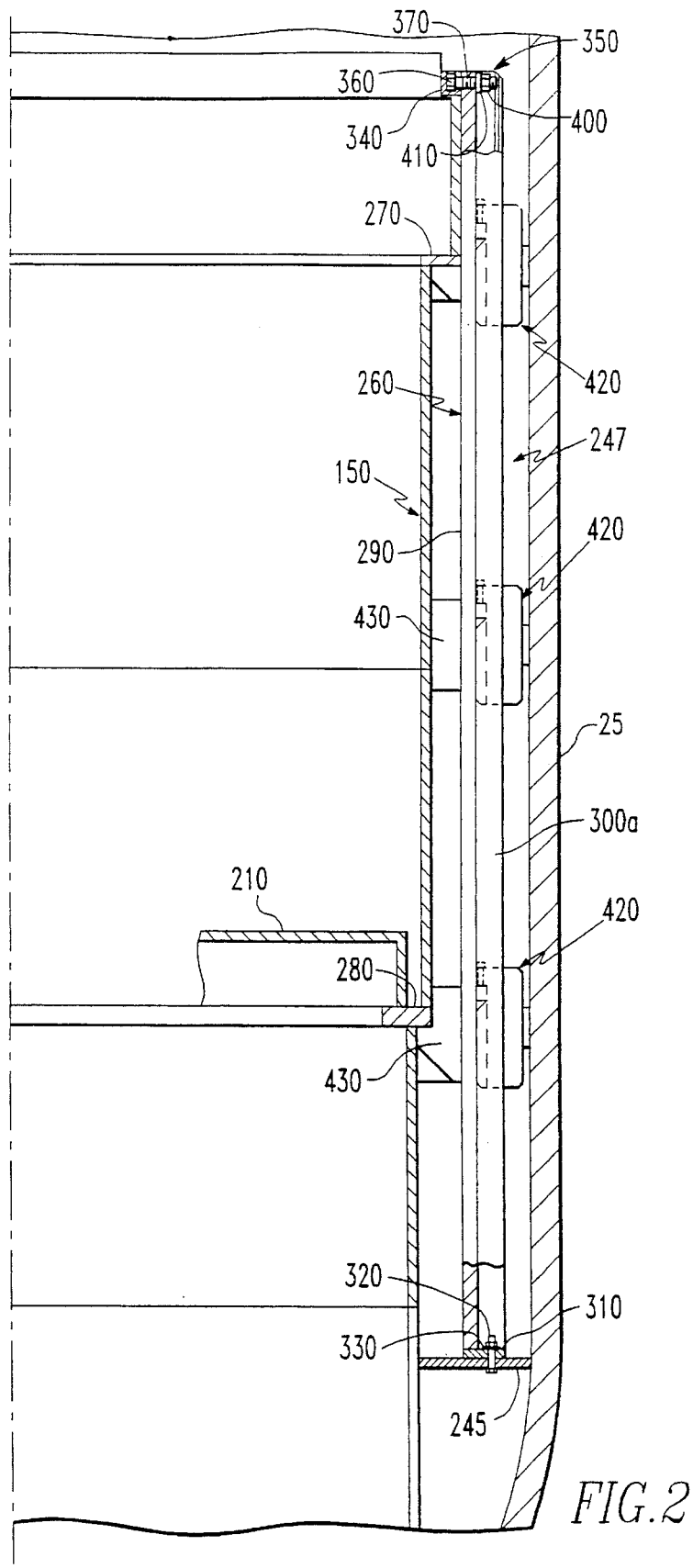
FIG. 2 depicts a view in side elevation of a device for reinforcing a core shroud which surrounds the reactor vessel in the event of stress corrosion cracking or events of similar magnitude.
Figure 3:
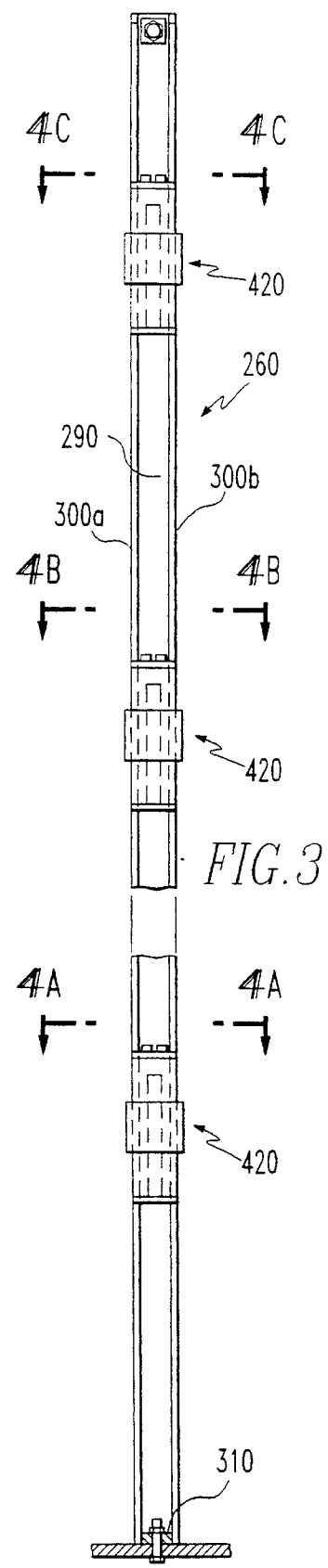
FIG. 3 depicts a view in front elevation of the device of FIG. 2.

Referring to FIGS. 2 and 3, one of the plurality of reinforcing devices 247 is shown in detail. The device 247 includes a vertically oriented beam 260 positioned against the core shroud 150 for reinforcing the shroud 150 in the event of stress corrosion cracking. Such cracking is likely, if at all, to occur where an upper portion of the shroud 150 joins its middle portion (generally designated by 270), and its middle portion joins its lower portion (generally designated by 280). The beam 260, which has a generally U-shaped horizontal cross section, includes a base section 290 having two lip portions 300a and 300b each respectively projecting outwardly from the outer portions of the base section 290. At the bottom of the beam 260, a base plate 310 is attached to the beam 260 for allowing the beam 260 to rest on the annular ring 245. The base plate 310 is attached to the annular ring 245 by a bolt 320 for rigidly attaching the beam 260 to the annular ring 245. The bolt 320 further includes a washer 330 for ensuring a tight fit to the annular ring 245.

To enable the beam 260 to be supported at its top portion, a notch 340 is made into the shroud 150 by any suitable means, such as by an electro-machine discharge (EMD) which is well known in the art. A bolt 350 rests in the notch 340 with its bolt head 360 positioned in the notch 340 and with its shaft 370 projecting through the base section 290 of the beam 260. A nut 400 and washer 410 are placed on the shaft 370 for firmly positioning the beam 260 and shroud 150 into their respective operating positions. Once the beam 260 is placed in its vertical position, three radial supports 420 are positioned in a spaced apart relationship with each other along the beam 260 and between the beam 260 and the reactor wall 25 for transmitting the forces absorbed by the beam 260 from the shroud 150 to the reactor wall 25. The supports 420 also function to uniformly distribute the absorbed forces of the beam 260 along the beam 260.

A portion 430 is attached between the base section 290 and the shroud 150 on the two lower radial supports 420 for, in addition to the attachment of the beam 260 to the shroud 150 at its top and bottom portions, transmitting forces from the shroud 150 to the beam 260. The portion 430 may be made of 316 stainless steel.

Figure 4B:
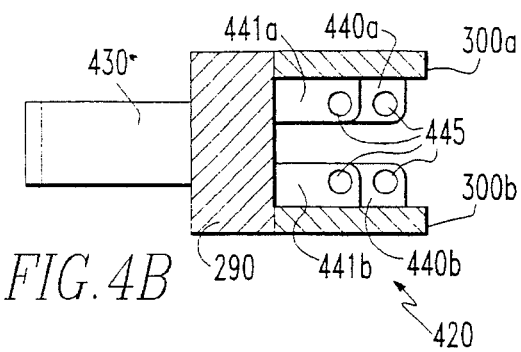
FIG. 4B is a view taken along line 4B—4B of FIG. 3.
Figure 4A:
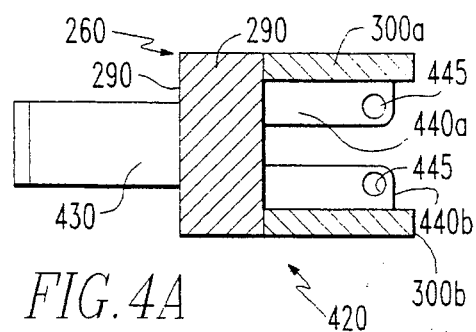
FIG. 4A is a view taken along line 4A—4A of FIG. 3.
Figure 4C:
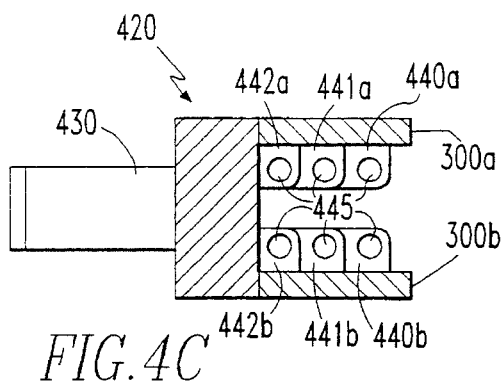
FIG. 4C is a view taken along line 4C—4C of FIG. 3.

Referring to FIG. 4A, a portion of the radial support 420, which is attached at the extreme bottom of the beam 260, is shown in detail. The beam 260 includes two generally rectangular shaped support shelves 440a and 440b respectively welded against each lip portion 300a and 300b of the beam 260 for supporting a mating portion 450 (see FIG. 5) of the radial support 420. As can be seen in FIG. 4B, the support shelves 441a and 441b at the middle portion of the beam 260 are shorter in length than the support shelves 440a and 440b at the bottom portion. The reason for this will be described later in detail. Similarly, as seen in FIG. 4C, two support shelves 442a and 442b positioned at the top of the beam 260 are shorter in length than the other support shelves 441a, 441b, 442a and 442b positioned below it. Each support shelf includes a hole 445 therein for receiving a bolt 460 (see FIG. 5) for attaching all shelves to its mating portion 450 (See FIG. 5).

Figure 5:
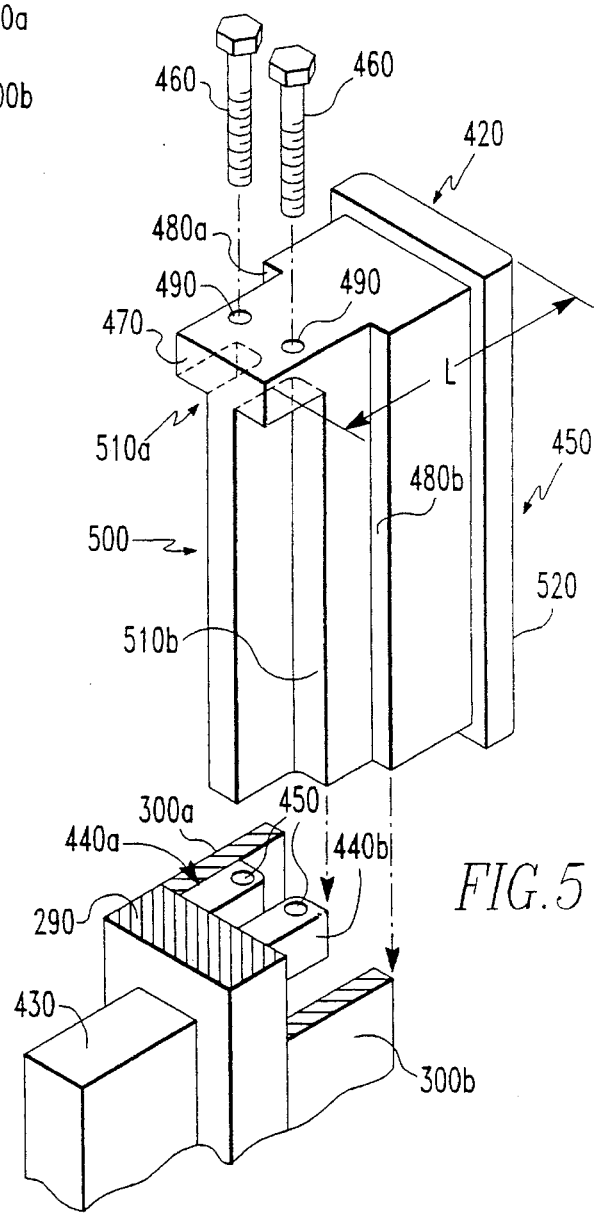
FIG. 5 is a perspective view of the reinforcing device for the core shroud.

Referring to FIG. 5, the mating portion 450 of the radial support 420 for the bottom location is shown. The mating portion 450 includes a generally tapered top portion 470 having a notched out portion 480a and 480b at its two corners. The top portion 470 includes two holes 490 therein which respectively align with the mating holes 445 in the support shelves 440a and 440b for each receiving a bolt 460 when so aligned. The lower portion of the mated portion 450 also includes a generally tapered body 500 which also includes two notched out portions 510a and 510b which conform generally to the shape of the support shelves 440a and 440b.

To install the mated portion 450 to the support shelves 440a and 440b at the lower portion of the beam, the mated portion 450 is placed in the interior of the beam 260 (see FIG. 3) with the notches 480a and 510a, which are positioned in one corner of the mated portion 450, positioned directly over the support shelf 440a which is positioned in the same corner of the beam 260. The other notches 480b and 510b on the opposite corner of the mated portion 450 are also so aligned with the other support shelf 440b. The mated portion 450 is slid down the interior of the beam 260 until the top portion 470 contacts the lower support shelves 440a and 440b.

When in this position, the holes 450 and 490 are in registry with each other so that the bolts 460 can be placed therein for rigidly attaching the support shelves 440a and 440b and its mated portion 450. An end portion 520 is attached to the mating portion 450 for resting against the wall 25 of the reactor vessel 10 which, in turn, provides the mechanical communication between the wall 25 and the mated portion 450.

Although only the mated portion 450 at the extreme lower portion was described, the mated portion 450 for the middle portion is the same except that the length (L) is longer so that it mates to its mating support shelves 441a and 441b; while at the same time, it has to be short enough so that it passes over the extreme top support shelves 442a and 442b when it is slid down the beam 260. It will also be apparent to those skilled in the art that all the notches 510*a* and 510*b* in the mated portion 450 at the middle and extreme top portion of the beam 260 are not quite as large as the notches in the mating portion 450 at the extreme bottom so that they will conform to their support shelves 441*a* and 441*b*. The mated portion 450 for the extreme top portion of the beam 260 is the same as the extreme bottom mated portion 450 except that the top portion 470 conforms to the entire shape of the interior of the beam 260, i.e., there are no notches in the top portion 470.

It is thought that the present invention and many of its attendant advantages will be understood from the foregoing description and it will be apparent that various changes may be made in the form, construction and arrangement without departing from the spirit and scope of the invention or sacrificing all of its material advantages, the form hereinabove described being merely a preferred or exemplary embodiment thereof.

We claim:

1. An apparatus, which reinforces a core shroud that is contained within a reactor vessel, operable in the event of cracking or events of similar magnitude in the core shroud, the apparatus comprising:

(a) a rector vessel wall positioned surrounding the shroud;

(b) a plurality of beams positioned generally axially and in a spaced apart relationship with each other around the shroud, each beam attached to the shroud for absorbing the forces generated in the shroud, each beam having a generally U-shaped cross section for allowing easy installation of each said radial support, and each beam having a support shelf positioned in its interior; and (c) a plurality of radial supports positioned between each said beam and said reactor vessel wall for transmitting any forces absorbed by each said beam to said reactor vessel wall which, in effect, reduces the loads in each said beam and also maintains generally uniform distribution of the loads absorbed by each said beam for allowing each said beam to efficiently absorb the generated forces, each said radial support including a mating portion which attaches to the beam shelf for assisting in transmitting the absorbed forces in said beam to the wall.

2. The apparatus as in claim 1, wherein said radial support includes a connecting portion for connecting said beam and the core shroud which, in turn, functions to pass any stress to a said beam.

3. The apparatus as in claim 2, wherein said beam includes two support shelves positioned in its interior for receiving the mating portion of said radial support, the mating portion having a shape which, in part, conforms to the support shelves.

* * * * *